United States Patent [19]
Henrich

[11] 3,748,061
[45] July 24, 1973

[54] PROPELLER CONSTRUCTION
[75] Inventor: Donald A. Henrich, Lake Villa, Ill.
[73] Assignee: Outboard Marine Corporation, Waukegan, Ill.
[22] Filed: Dec. 13, 1971
[21] Appl. No.: 207,490

Related U.S. Application Data
[63] Continuation-in-part of Ser. No. 57,283, July 22, 1970, abandoned.

[52] U.S. Cl..................... 416/93, 416/134, 416/169
[51] Int. Cl.............................................. B63h 1/20
[58] Field of Search..................... 416/93, 134, 169

[56] References Cited
UNITED STATES PATENTS

| 3,477,794 | 11/1969 | Abbott et al. | 416/134 |
|---|---|---|---|
| 3,563,670 | 2/1971 | Knuth | 416/93 |
| 2,539,630 | 1/1951 | Krueger et al. | 416/134 X |
| 2,993,544 | 7/1961 | Carlson | 416/134 X |

Primary Examiner—Everette A. Powell, Jr.
Attorney—Robert E. Clemency et al.

[57] ABSTRACT

Disclosed herein is a propeller including a bushing part adapted to be mounted on a propeller shaft for common rotary movement of the bushing part with the propeller shaft, a resilient member bonded to the outer periphery of the bushing and having an outer non-circular configuration including a series of alternate areas of greater and lesser radial distance from the axis of said bushing and a propeller blade part having a hub including a bore with an inner configuration including a series of alternate areas of greater and lesser radial distance from the axis of the propeller and detachably receiving said resilient member.

11 Claims, 3 Drawing Figures

Patented July 24, 1973
3,748,061
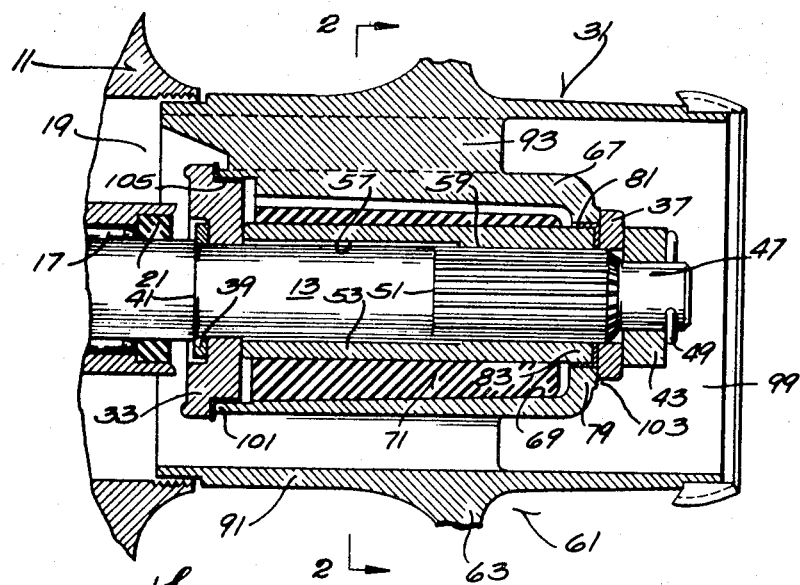
Fig. 1
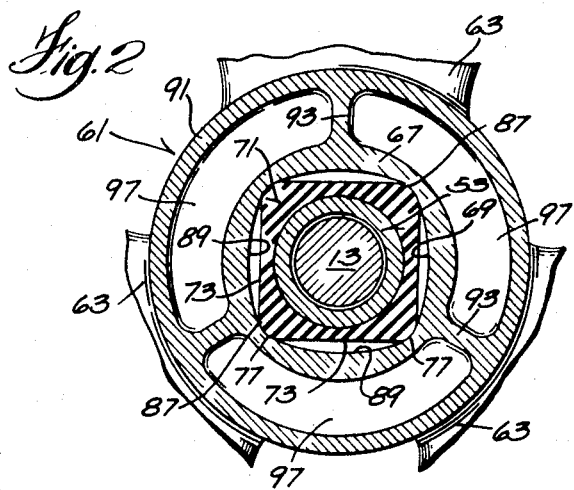
Fig. 2
Fig. 3

PROPELLER CONSTRUCTION

This application is a continuation-in-part of my earlier filed application entitled "Propeller Construction" Ser. No. 57,283 filed July 22, 1970, now abandoned.

BACKGROUND OF THE INVENTION

In the past, it has been known to construct propellers with inner and outer hubs or sleeves each of which was bonded to an intervening annulus of rubber or other like material. One such prior construction included the construction shown in the Strang U.S. Pat. No. 3,356,151, issued Dec. 5, 1967.

In another prior art device shown in the Conover U.S. Pat. No. 3,113,625, issued Dec. 10, 1963, an annulus of rubber was bonded to an inner sleeve and, in conjunction with an annular bend of brake lining material, provided a slip clutch. The annular brake band was attached to an intermediate hub having a splined connection with a third hub which carried the propeller blades and which was removable for replacement purposes relative to the intermediate hub.

The above-identified Strang and Conover patents, as well as such patents as the Wolff U.S. Pat. No. 2,543,396 and the Knuth U.S. Pat. No. 3,563,670, disclose a rubber annulus which is under radial compression in order to afford torque transmission while also affording rotary slippage relative to a hub in the event of an overload condition. The radial compression is exerted through forces applied by concentric hubs located radially inwardly and outwardly of the annulus. Such radially applied forces provide frictional restraint to rotary slippage under normal torque transmission conditions. However, such radial forces also preclude axial separation in the field between the relatively rotatable hub and annulus.

SUMMARY OF THE INVENTION

The invention provides a propeller having a propeller blade part with a hub having a bore and a bushing part having an outer surface. Bonded either to the outer surface of the bushing part or to the interior bore of the hub is a resilient member having a surface of non-circular configuration which forms one part of a readily axially separable, male-female, resilient drive connection. The other part of the separable resilient drive connection comprises formation of the other of the bushing part and the propeller blade part hub with a cooperating non-circular configuration adapted to be readily removably or detachably interfitted with the non-circular configuration of the resilient member and to provide voids affording space for deformation of the resilient member so as to afford full rotary slippage of the resilient member relative to the interfitting part in response to overload conditions. As a result, rotative drive from the propeller shaft to the propeller blade is normally transmitted circumferentially through the axially separable interfitting connection of the resilient member and the interfitted part and independently of any radially acting force which affords frictional restraint to rotary slippage and thereby also affords torque transmission.

In accordance with the invention, in the event of excessive loading on the propeller blade, the voids, and the freedom from fixed connection between the resilient member and the interfitted part, permit such deformation of the resilient member as to afford full rotary slippage between the interfitted part and the resilient member so as to substantially discontinue torque transmission and thereby also to reduce damage to the blades and/or possible damage to the mechanism driving the propeller shaft. Upon removal of the excess loading, the rotary driving connection is immediately re-established. In addition, because of the absence of radial forces acting between the hub and resilient member, and because the male part is suitably dimensioned to afford ease of insertion in and removal from the female part, the driving connection between the resilient member and the interfitting part is readily separably detachable in the field, i.e., on a boat, for instance, at dockside or elsewhere, so as to afford disassembly of the propeller and replacement in the field of the propeller blade part in the event of damage to the blades. No special tooling is required to obtain relative axial movement between the male and female parts to obtain their disassembly.

In the illustrated construction, the resilient member is bonded to the bushing and has an outer non-circular configuation with alternate areas of lesser and greater radial distance from the propeller axis. The propeller blade part has a hub with a bore having a non-circular configuration with alternate areas of lesser and greater radial dimensions from the propeller axis with the areas of greater radial distance being generally of the same or slightly less radial extent as the areas of greater radial distance on the resilient member and with the areas of lesser radial distance being spaced at a materially greater radial distance from the propeller axis than the areas of lesser radial distance on the resilient member, whereby to provide the before mentioned voids.

The arrangement provided by the invention also serves to afford transmission of forward and rearward thrust from the propeller part to the propeller shaft independently of the separable and resilient drive connection.

One of the principal objects of the invention is the provision of a two part propeller having a resilient drive connection which also affords ease of separation of the two parts from each other, thereby facilitating ease of replacement of a damaged propeller blade part and which also serves to lessen the possibility of damage by providing a shock absorbing action and full rotary slip clutch action. Such replacement can also be effected more economically due to replacement of only a part of the over-all propeller. In addition, the invention provides selective use of several different pitch and size propeller blade parts with a single part attached to the propeller shaft, thereby affording further economies.

Another principal object of the invention is the provision of a new and improved and more advantageous propeller construction.

Still another of the principal objects of the invention is the provision of a propeller having a readily separable or detachable resilient drive connection providing shock absorbing and full rotary slip clutch capacity to lessen possible damage to the propeller blades and to the propeller shaft driving mechanism upon the striking of an underwater obstacle.

Another of the principal objects of the invention is the provision of a propeller arrangement wherein forward and reverse thrust is transmitted to a propeller shaft independently of a resilient drive connection between readily separable propeller parts.

DRAWINGS

FIG. 1 is a fragmentary sectional view of a marine propulsion device including a propeller embodying various of the features of the invention.

FIG. 2 is a sectional view taken generally along line 2—2 of FIG. 1.

FIG. 3 is a perspective view of the portion of the construction shown in FIG. 1.

DETAILED DESCRIPTION

Shown fragmentarily in FIG. 1 is a part of a lower unit 11 of a marine propulsion device such as, for instance, a stern drive unit or an outboard motor. Extending from the lower unit 11 is a propeller shaft 13 which is suitably journaled within the lower unit 11 by bearings 17 and which projects centrally through a generally annular exhaust gas discharge outlet 19. As shown, a seal 21 can also be employed between the propeller shaft 13 and the lower unit 11 to prevent water reaching the bearings 17. It should be understood that while the illustrated construction employs a so-called "through-the-prop" exhaust gas discharge system, the invention is not limited thereto.

Mounted on the propeller shaft 13 rearwardly of the lower unit 11 is a propeller 31 in general accordance with the invention. The propeller 31 is mounted on the propeller shaft 13 between a forwardly located thrust bearing and sleeve assembly 33 and a rearwardly located spacer or washer 37. Thrust from the thrust bearing and sleeve assembly 33 is transmitted to the propeller shaft 13 by a thrust washer 39 which is engaged against a shoulder 41 on the propeller shaft 13. At the rearward end, the washer 37 is held in position by a nut 43 threaded on a terminal portion 47 of the propeller shaft 13. A cotter pin 49 prevents unwanted movement of the nut 43 on the threaded portion 47 of the propeller shaft 13. As is more or less conventional, the propeller shaft 13 includes a splined portion 51 which drivingly engages the propeller 31 to normally afford common rotary movement of the propeller 31 with the shaft 13.

The propeller 31 includes a bushing part 53 comprising a bushing which is adapted to be received on the propeller shaft 13 and, accordingly, has an internal bore 57 including a splined portion 59 adapted to interfit with the splined portion 51 of the propeller shaft 13. The propeller 31 also includes a propeller blade part 61 which includes a series of radially extending (fragmentarily shown) propeller blades 63 and a hub 67 having an inner bore 69.

In accordance with the invention, the propeller 31 also includes a readily separable resilient drive connection between the propeller blade part 61 and the bushing part 53, which drive connection also affords full rotary slip clutch action, as well as shock absorption in the event of overloading. The readily separable resilient drive connection comprises, in part, a resilient drive member 71 which is fabricated of rubber or rubber-like material and which is bonded or otherwise suitably fixed to the periphery of either one of the bushing part 53 and the inner bore 69 of the hub of the propeller blade part 61. The separable resilient drive connection also includes the formation of the other of the bushing part 53 and the hub 67 with a configuration which cooperably and readily removably interfits with the configuration of the resilient drive member 71 so as to afford both selective separation, torque transmission under normal loading, and, in the event of overloading, both shock absorption and full rotary slip clutch capacity. In the construction illustrated in the drawings, the drive member 71 is bonded to the bushing part 53 and the drive member 71 is separably interfitted within the inner bore 61 of the propeller blade part 61.

Further in accordance with the invention, the resilient and separable drive connection is provided by formation of the periphery of one of the resilient member 71 and the other of the hub 67 and the bushing part 53 with an inner non-circular periphery having a configuration including a series of alternate areas of greater and lesser radial distance from the axis of the propeller and the formation of the other of the resilient member 71 and the other of the bushing part 53 and the hub 67 with an outer non-circular periphery received in the just mentioned inner periphery and having a configuration including a series of alternate areas of greater and lesser radial distance from the propeller axis. Also in accordance with the invention, the outer configuration areas of greater radial distance have a radial extent substantially equal to or slightly less than the radial extent of the inner configuration areas of greater radial distance and are received in the inner configuration areas of greater radial distance, whereby to afford an interfitted power transmitting drive connection, and the outer configuration areas of lesser radial distance have a radial extent materially less than the inner configuration areas of lesser radial distance, whereby to provide voids affording deformation of the resilient member under overload conditions.

As already indicated, in the illustrated construction, the resilient member 71 is bonded to the bushing part 53 and has the just described outer periphery which is received in the inner periphery which is formed on the interior of the bore 69 in the propeller blade part hub 67. In addition, while various non-circular configurations can be employed, in the disclosed construction, the normal outer configuration of the resilient drive member 71 is generally square including a series of relatively flat faces 73 connected by rounded corners 77. The resilient drive member 71 is also constructed so that the configuration is essentially unchanged throughout the length thereof except that the size or dimensions of its outer configuration decreases in cross sectional area from the front end to the rearward end.

The inner hub 67 of the propeller blade part 61 is generally of hollow construction with the bore 69 having an inner configuration dimensioned to readily removably receive the assembly of the resilient member 71 and the bushing part 53 so as to afford, under normal drive conditions, an interfitting relation providing for common rotation so as to transmit torque to the propeller blade part 61 in response to rotation of the assembly of the resilient member 71 and the bushing part 53. In addition, the separable interfitting relation also affords, in the event of sudden and/or excessive loading, both shock absorbing capability and full rotary slip clutch action.

In addition, the hub 67 has a rearwardly located flange or end wall 79 which is centrally apertured at 81 to receive a rearward portion 83 of the bushing.

The configuration of the bore 69 of the inner hub 67 is also generally non-circular in cross section having areas of greater radial distance from the rotative axis of the propeller and areas of lesser radial distance from the rotative axis. While various configurations can be employed, dependent at least in part on the outer configuration of the resilient member 71, the disclosed construction has four rounded corners or areas 87, which corners have a relatively short radius and are located at about the same or slightly greater radial distance from the rotative axis as the rounded corners 77 of the resilient member 71 and four intervening areas 89 which have a relatively greater radius than the areas or corners 87 and which are located at a lesser radial distance from the rotative axis than the corners 87 but at a greater radial distance than the generally flat faces 73 of the resilient member 71. In like manner to the taper provided on the resilient member 71, the inner configuration of the inner hub bore 69 decreases in size or dimensions from the forward end to the rearward end. As also already noted, the inner configuration of the bore 69 is such as to freely permit insertion and withdrawal of the resilient member 71. The tapers constitute a very desirable means for assisting in inserting or assembling and withdrawing or disassembling of the resilient member 71 and bonded bushing part 53 relative to the propeller part 61.

The propeller part 61 also includes an outer hub 91 which supports the blades 63 and which is connected and radially spaced from the inner hub 67 by an angularly spaced series of vanes or fins 93. As a consequence, the propeller part 61 shown in the drawings includes an annular exhaust passageway which is located between the hubs 67 and 91, which communicates with the lower unit discharge outlet 19, which is sub-divided into three passageway portions 97, and which has its own rearwardly located discharge opening 99.

It is noted that the forward edge of the inner hub 67 bears against the forwardly located thrush bushing and sleeve assembly 33 so as to deliver forward thrust to the propeller shaft 13 independently of the resilient member 71 and the separable resilient drive connection between the propeller blade part 61 and the bushing part 53. It is noted that the rearward spacer or washer 37 has a sufficient diameter to engage the rearward surface 103 of the end wall 79 of the propeller blade part inner hub 67 to afford transmission of rearward thrust to the propeller shaft 13 independently of the resilient member 71 and the separable resilient drive connection between the propeller blade part 61 and the bushing part 53.

In order to prevent water from reaching the separable resilient drive connection between the bushing part 53 and the propeller blade part 61, a seal member 105 can be provided between the forward thrust bearing and sleeve assembly 33 and the forward edge 101 of the inner hub 67. An additional seal member can also be provided between the outer periphery of the rear portion 83 of the bushing part 53 and the aperture 81 in the inner hub end wall 79 and between the rearward end surface of the bushing part 53 and the washer or spacer 37.

From the foregoing, it is apparent that the readily separable interfitting connection between the resilient member 71 and the inner hub 67 provides for ease of detachment of the propeller blade part 61 from the bonded assembly of the bushing part 53 and the rubber drive member 71 whenever the nut 43 and spacer 37 are removed. In addition, the separable connection between the inner hub 67 and the drive member 71 provides a resilient drive which, when the propeller 31 is excessively loaded as, for instance, when striking an object, will permit the bushing part 53 to rotate or ratchet relative to the propeller part 61 during any such overload condition. However, whenever the overload condition terminates, the rotative drive is immediately restored. In addition, the disclosed drive connection very beneficially constitutes a shock absorbing means and permits the non-use of such prior safety devices as shear pins and the like.

While the illustrated construction includes a resilient member 71 on the bushing part 53, various of the features of the invention can also be obtained by forming the bushing part with a rigid outer surface and by providing the hub of the propeller blade part 61 with a resilient socket arranged to receive the rigid outer surface of the bushing part so as to provide the same operational features as the illustrated construction. The detachable resilient drive connection of the invention is also applicable to propellers which do not include through-the-hub exhaust.

Various of the features of the invention are set forth in the following claims.

What is claimed is:

1. A propeller including a propeller blade part including a hub having a bore, a bushing part adapted to be mounted on a propeller shaft for common rotary movement of said bushing part with the propeller shaft, a resilient member bonded to one of the outer periphery of said bushing part and the inner periphery of said bore, and means for providing a readily separable connection between said resilient member and the other of said bushing part and said propeller blade part hub and for providing unlimited rotary slippage between said resilient member and said other of said bushing part and said propeller blade part hub in response to attempted excessive torque transmission between said blade part and said bushing part, said separable connection and rotary slippage providing means comprising the formation of one of said resilient member and said other of said bushing part and said propeller blade part hub with an inner periphery having a configuration including a series of alternate areas of greater and lesser radial distance from the axis of said propeller and the formation of the other of said resilient member and said other of said bushing part and said propeller blade part hub with an outer periphery readily removable from and receivable in said inner periphery and free of fixed connection therewith and having a configuration including a series of alternate areas of greater and lesser radial distance from the axis of said propeller, said inner periphery configuration areas of lesser radial distance having a radial extent less than the radial extent of said outer periphery configuration areas of greater radial distance and greater than the radial extent of said outer periphery configuration areas of lesser radial distance.

2. A propeller in accordance with claim 1 wherein said outer periphery configuration areas of greater radial distance have a radial extent substantially equal to the radial extent of said inner periphery configuration areas of greater radial distance.

3. A propeller in accordance with claim 1 wherein said resilient member is bonded to said bushing part and said resilient element includes said outer configuration.

4. A propeller in accordance with claim 1 wherein said inner configuration is substantially the same for substantially the length thereof and the dimensions of said inner configuration decrease from the front to the rear thereof and wherein said outer configuration is substantially the same for substantially the length thereof and the dimensions of said outer configuration decrease from the front to the rear thereof.

5. A propeller in accordance with claim 1 wherein said bushing part has a bore adapted for receiving the propeller shaft and wherein said bushing part bore has a portion adapted for engagement with the propeller shaft to provide common rotary movement of said bushing part with the propeller shaft.

6. A propeller in accordance with claim 1 wherein said member is of rubber-like material.

7. A propeller in accordance with claim 1 wherein said propeller blade part includes a series of angularly spaced radially outwardly extending fins projecting from said first mentioned hub and an outer hub connected to said fins and radially spaced from said first mentioned hub to define a series of axially extending passages through said propeller and a series of blades extending from said outer hub.

8. A propeller in accordance with claim 7 wherein said bushing part has a rearward portion uncovered by said member and said first mentioned hub terminates inwardly of the rear end of said outer hub and includes a flange portion apertured to permit passage therethrough of said rearward portion of said bushing part.

9. A propeller part adapted to be mounted on a bushing part which is adapted to be mounted on a propeller shaft for common rotary movement of said bushing part with the propeller shaft and which includes a bushing and a resilient member bonded to the outer periphery of said bushing and having an outer configuration including a series of alternate areas of greater and lesser radial distance from the axis of said bushing, said propeller part including a hub having a bore with an inner configuration readily detachably receiving said bushing part and including a series of alternate areas of greater and lesser radial distance from the axis of said propeller affording unlimited rotary slippage in the event of excessive torque transmission.

10. A propeller in accordance with claim 1 including means for transmitting forward and reverse thrust from said blade part to the propeller shaft independently of said resilient member.

11. A propeller part in accordance with claim 9 and further including means for transmitting forward and reverse thrust from said propeller part to said propeller shaft independently of said resilient member.

* * * * *